United States Patent [19]

Fisher et al.

[11] Patent Number: 5,727,599
[45] Date of Patent: Mar. 17, 1998

[54] INSULATING SLEEVE FOR A FLUID PIPE

[75] Inventors: John H. Fisher, Novi; Henry A. Beckwith, Ypsilanti, both of Mich.

[73] Assignee: Ford Motor Company, Dearborn, Mich.

[21] Appl. No.: 585,985

[22] Filed: Jan. 16, 1996

[51] Int. Cl.⁶ ............................................. F16L 11/00
[52] U.S. Cl. ..................... 138/156; 138/110; 138/149; 138/148; 138/121
[58] Field of Search ........................ 138/156, 149, 138/110, 148, 114, 121, 122; 181/228

[56] References Cited

U.S. PATENT DOCUMENTS

| | | |
|---|---|---|
| 742,689 | 10/1903 | Lord ................................. 138/156 |
| 2,089,909 | 8/1937 | Mansfield ....................... 138/148 X |
| 2,425,245 | 8/1947 | Johnson . |
| 3,058,861 | 10/1962 | Rutter . |
| 3,060,069 | 10/1962 | Sindars . |
| 3,134,611 | 5/1964 | Iversen . |
| 3,374,856 | 3/1968 | Wirt . |
| 4,205,034 | 5/1980 | Newberry . |
| 4,605,043 | 8/1986 | Grenier ............................ 138/149 |
| 4,674,542 | 6/1987 | Baillet ............................... 138/148 |
| 4,967,799 | 11/1990 | Bradshaw et al. . |
| 4,970,351 | 11/1990 | Kirlin . |
| 5,122,401 | 6/1992 | Finkelstein . |
| 5,123,453 | 6/1992 | Robbins ........................ 138/156 X |
| 5,192,039 | 3/1993 | Williams ....................... 138/149 X |
| 5,427,849 | 6/1995 | McClintock et al. ......... 138/156 X |

FOREIGN PATENT DOCUMENTS

| | | |
|---|---|---|
| 53-83151 | 7/1978 | Japan ................................ 138/156 |
| 6-169514 | 6/1994 | Japan . |

*Primary Examiner*—Patrick F. Brinson
*Attorney, Agent, or Firm*—Raymond L. Coppiellie

[57] ABSTRACT

A protective sleeve for a fluid pipe is disclosed. The sleeve includes an inner and outer member which provide heat, sound and abrasion resistance. The inner member includes a pair of terminal edges which are spaced apart a predetermined distance. This distance is greater than the distance between the terminal edges of the outer member. A method of making such a protective sleeve is also disclosed.

5 Claims, 1 Drawing Sheet

5,727,599

INSULATING SLEEVE FOR A FLUID PIPE

BACKGROUND OF THE INVENTION

1. Field of the Invention

The present invention relates generally to a fluid pipe covering. More particularly, the present invention relates to a heat, abrasion and sound insulating sleeve for a fluid pipe in an automotive vehicle.

2. Disclosure Information

Due to the downsizing of engine compartments, many underhood engine components are located in close proximity to one another. Typically, fluid pipes connect many of the engine components together. These fluid pipes carry a variety of automotive fluids, of various temperatures. In order to protect surrounding components or to prevent condensation from forming on the pipes, these pipes must be insulated. Of course, given the small space within the engine compartment, surrounding components may come into contact with the insulated pipe, causing a wearing of the insulating material circling the pipe.

Many insulating sleeve members have been proposed to solve the problem of abrasion against the insulated pipe. For example, U.S. Pat. No. 4,967,799 discloses a plastic abrasion-resistant protective sleeve member for covering a radiator hose. The '799 sleeve is unaffected by heat, thereby making it both abrasion and heat resistant. However, there is no provision in the '799 sleeve for deadening the sound produced by fluid passing through the radiator hose.

Another problem associated with conventional protective sleeves is that the sleeves are often secured to the fluid pipes by adhesive or tape. Often, the fluid pipe to be protected is simply coated with the adhesive and the sleeve applied. Unless an operator is very careful, the adhesive can contaminate the areas surrounding the pipe.

Therefore, it would be advantageous to provide an insulating sleeve member which not only provides for heat and abrasion resistance, but which also deadens the sound produced by the fluid rushing through the fluid pipe and which is easily applied by an operator.

SUMMARY OF THE INVENTION

In accordance with the present invention, there is provided an abrasion, sound and heat resistant protective sleeve for covering fluid pipes in an automotive vehicle, comprising an elongated, generally cylindrical inner member having a pair of terminal edges extending the longitudinal length thereof, the pair of terminal edges defining a first gap of predetermined distance therebetween, and an elongated, generally cylindrical outer member circumferentially surrounding the inner member. The outer member has a pair of terminal edges extending along the longitudinal length thereof. The terminal edges of the inner member are offset from the terminal edges of the outer member by a predetermined distance. The pair of outer member terminal edges defines a second gap of predetermined distance therebetween such that the distance of the second gap is smaller than the distance defined by the first gap. The inner member is secured to the outer member such that when the sleeve is rolled into a generally cylindrical shape, an air space is formed between opposing surfaces of the inner and outer members.

A method of making such a sleeve is also disclosed. The method comprises the steps of providing a first generally planar piece of sound deadening material; cutting the sound deadening material into a generally rectangular member defining longitudinal and transverse axes and including an inner pipe contacting surface, an outer surface and a pair of terminal edges extending the longitudinal length thereof; providing a generally cylindrical heat and abrasion resistant material defining longitudinal and transverse axes and including an inner surface and an outer surface. The cylindrical member is cut along its longitudinal length to define a pair of terminal edges extending the longitudinal length thereof. The method also includes the steps of dispensing a bead of adhesive on the inner surface of the heat and abrasion resistant material a predetermined distance from each of the pair of terminal edges of the cylindrical member; placing the sound deadening material onto the heat and abrasion resistant material such that the outer surface of the sound deadening material contacts the bead of adhesive on the heat and abrasion resistant material; and curing the adhesive at a predetermined temperature for a predetermined time.

It is an object of the present invention to provide an improved protective sleeve for fluid pipes within an engine compartment of an automotive vehicle.

It is a further object of the present invention to provide a protective sleeve which provides sound, heat and abrasion resistance. These and other objects, features and advantages of the present invention will become apparent from the drawings, detailed description and claims which follow.

DETAILED DESCRIPTION OF THE PREFERRED EMBODIMENTS

Figure 1:
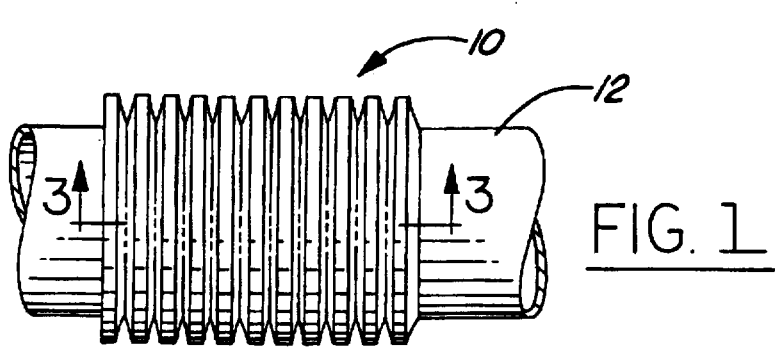
FIG. 1 is a side-elevation view of a fluid pipe having a protective sleeve structured in accord with the principle of the present invention.

Referring now to the drawings, FIG. 1 shows a fluid pipe 12 surrounded by a protective sleeve 10 according to the present invention. The fluid pipe 12 may be any type of fluid carrying member, but the present invention has particular utility for covering fluid pipes or wires contained within an engine compartment of an automotive vehicle.

Figure 2:
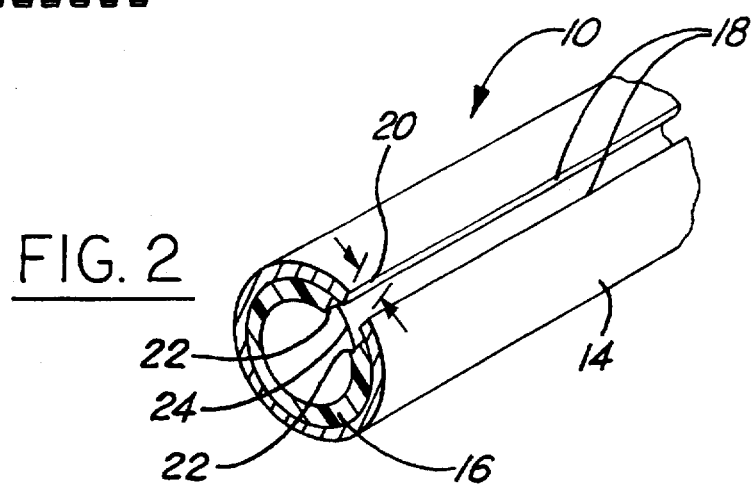
FIG. 2 is a perspective view of the protective sleeve of the present invention.
Figure 3:
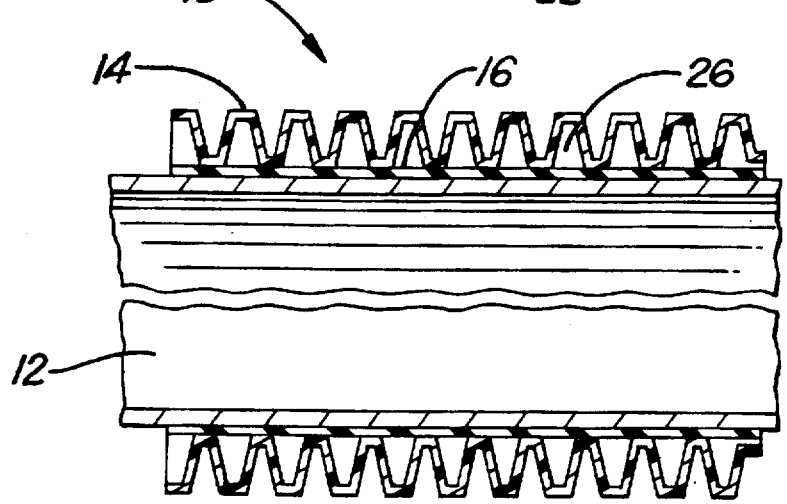
FIG. 3 is a cross-sectional view taken along line 3—3 of FIG. 1.

FIGS. 2 and 3 best illustrate the protective sleeve of the present invention. The sleeve 10 includes an elongated, generally cylindrical outer member 14 and an elongated, generally cylindrical inner member 16. The outer member 14 surrounds the fluid pipe 12 and the inner member 16. The outer member 14 includes a pair of terminal edges 18 extending along the longitudinal length of the member. The terminal edges 18 define a gap 20 between them. In the preferred embodiment, the gap 20 is approximately 0.25 millimeters wide and typically is a slit formed by the cutting of the outer member along its longitudinal length. The gap or slit 20 provides a means for placing the sleeve 10 over the fluid pipe 12 as will be described in greater detail below.

The inner member 16 is also an elongated, generally cylindrical member having a pair of terminal edges 22. The terminal edges 22 are also spaced apart a predetermined distance to define a gap 24 between them. The gap 24 preferably does not exceed about ten millimeters in width, and in the most preferred embodiment, is approximately six millimeters wide. The gap 24 is larger than the gap 20 which provides a key advantage of the present invention. By sizing the inner and outer members 16, 14 such that the gap 24 is larger than the gap 20, there is a greater likelihood that the outer member 14 will completely surround the fluid pipe to be protected. If the inner and outer members were to instead define equidistant gaps, the outer member might not completely surround the fluid pipe, thereby exposing a portion of the pipe or its surrounding components to unwanted heat, condensation or abrasion.

As will be described in greater detail below, the inner member 16 is secured to the outer member 14 with an adhesive at a location just offset from the terminal edges 22 of the inner member. Placing the adhesive at this location prevents the adhesive from flowing into gap 24 and creating a possible source of interfering contact between the pipe to be covered and the protective sleeve. It would be undesirable to have this interfering contact since it may impede the application of the sleeve over the tube. By securing the inner member 16 to the outer member 14 adjacent only the inner member terminal edges 22, excessive adhesive is not wasted and an air space 26 is formed between the inner and outer members. This air space advantageously provides sound deadening properties for the protective sleeve 10.

Figure 4:
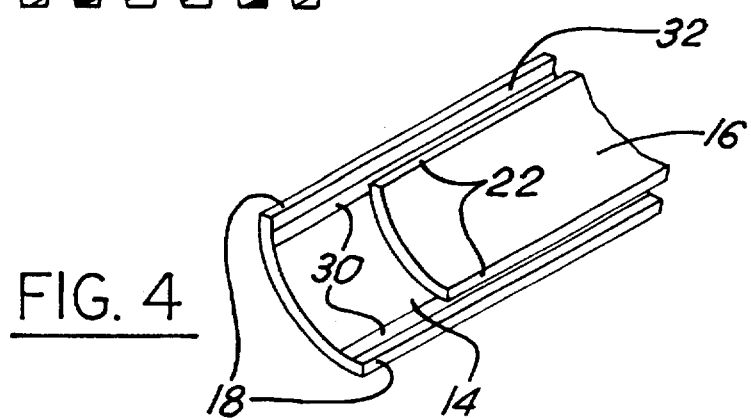
FIG. 4 is an exploded view of the inner and outer members of the protective sleeve, illustrating a method for making the protective sleeve according to the present invention.

A method of making the protective sleeve 10 will now be described with particular reference to FIG. 4. The first step in the method is to provide a sound deadening material suitable for inner member 16, such as a closed cell sponge rubber, and die cut it into an appropriate shape, preferably a rectangular shape having longitudinal and transverse axes and a pair of terminal edges 22. In the preferred embodiment, the sound deadening material for inner member 16 is provided in a generally cylindrical roll and when the material is die cut, the rectangular shaped member naturally rolls into an elongated cylindrical member. In the preferred embodiment, the inner member 16 is formed from EPDM rubber commercially available from American National Rubber of Cadiz, Ky.

The next step in the method of the present invention is to provide a heat and abrasion resistant material suitable for outer member 14, such as a nylon or nylon-filled synthetic plastic material. The heat and abrasion resistant material suitable for outer member 14 may be corrugated as shown in FIGS. 1 and 3, or have a smooth finish as shown in FIGS. 2 and 4. In the preferred embodiment, the heat and abrasion surface 32 of the cylindrical outer member 14 such that the terminal edges 22 are offset from the terminal edges 18 of the member 14. This placement insures that the gap 24 shown in FIG. 2 is larger than the gap 20. The offset amount preferably does not exceed five millimeters and is most preferably about three millimeters. The assembly of the sound deadening material on the abrasion and heat resistant material is then cured at a predetermined temperature for a predetermined amount of time. In the preferred embodiment, the adhesive is applied at approximately 300° F. and cures within 10–20 seconds at room temperature.

The protective sleeve 10 is placed over the fluid pipe 12 by simply spreading the sleeve apart at the gap 20 and placing the sleeve over the pipe. No adhesive is required to secure the sleeve 10 to the pipe 12. The outer member 14 will completely surround the pipe 12 since the inner member 16 has a larger gap 24 than does the outer member 14. In this respect, no portion of the fluid pipe to be protected is left unprotected. Also, by providing an adhesive bead 30 adjacent only the terminal edges 22 of inner member 16, a sound deadening air space is formed between the inner and outer members 14, 16. Adhesive beads 30 are preferably spaced in from terminal edges 22 a predetermined distance of about 2–3 millimeters. This selective adhesive placement is more economical than covering the entire inner surface of the outer member 14 with adhesive.

Many other variations of the present invention will no doubt occur to those skilled in the art. For example, the selection of alternative materials which can be used to provide the advantages of the present invention are numerous. It is the following claims, including all equivalents which define the scope of the invention.

What is claimed is:

1. An abrasions sound and heat resistant protective sleeve for covering fluid pipes in an automotive vehicle, comprising:

an elongated, generally cylindrical inner member having a pair of terminal edges extending the longitudinal length thereof, said pair of terminal edges defining a first gap of predetermined distance therebetween;

an elongated, generally cylindrical outer member circumferentially surrounding said inner member, said outer member having a pair of terminal edges extending along the longitudinal length thereof, said pair of outer member terminal edges defining a second gap of predetermined distance therebetween such that the distance of said second gap is smaller than the distance